US008805992B2

(12) United States Patent
Winter et al.

(10) Patent No.: US 8,805,992 B2
(45) Date of Patent: Aug. 12, 2014

(54) CONNECTION DEVICE AND PROTOCOL

(71) Applicant: Plantronics, Inc., Santa Cruz, CA (US)

(72) Inventors: Richard M Winter, Bristol (GB); Benedict A Findlay, Swindon (GB)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 13/802,177

(22) Filed: Mar. 13, 2013

(65) Prior Publication Data

US 2013/0204953 A1 Aug. 8, 2013

Related U.S. Application Data

(62) Division of application No. 12/828,655, filed on Jul. 1, 2010, now Pat. No. 8,504,629.

(51) Int. Cl.
*G06F 15/173* (2006.01)
*G06F 15/16* (2006.01)

(52) U.S. Cl.
USPC .......................................... 709/223; 709/206

(58) Field of Classification Search
USPC ......... 709/206, 223, 224, 225, 226, 227, 228, 709/229, 230–242; 455/41.2, 466, 567, 575
See application file for complete search history.

(56) References Cited

U.S. PATENT DOCUMENTS

| 5,077,554 | A  | * | 12/1991 | Orita et al. ................... 340/2.81 |
| 7,215,649 | B2 | * | 5/2007 | Yu et al. ......................... 370/313 |
| 7,397,345 | B2 | * | 7/2008 | Lauper .......................... 340/7.48 |
| 7,602,301 | B1 | * | 10/2009 | Stirling et al. ............. 340/573.1 |
| 8,019,091 | B2 |   | 9/2011 | Burnett et al. |
| 8,175,104 | B2 | * | 5/2012 | Connelly et al. .............. 370/401 |
| 8,292,433 | B2 |   | 10/2012 | Vertegaal |
| 8,331,987 | B2 |   | 12/2012 | Rosenblatt |
| 8,601,499 | B2 | * | 12/2013 | Tofighbakhsh et al. ........ 719/328 |
| 8,620,216 | B2 | * | 12/2013 | Castrogiovanni et al. ... 455/41.2 |
| 8,654,868 | B2 | * | 2/2014 | Jacobs et al. .................. 375/259 |
| 2003/0161292 | A1 | * | 8/2003 | Silvester ........................ 370/349 |
| 2005/0152294 | A1 |   | 7/2005 | Yu et al. |
| 2006/0093998 | A1 | * | 5/2006 | Vertegaal ....................... 434/236 |
| 2006/0193301 | A1 | * | 8/2006 | Cheng et al. .................. 370/338 |
| 2007/0038703 | A1 |   | 2/2007 | Tendjoukian et al. |
| 2007/0159998 | A1 | * | 7/2007 | Ruuska et al. ................ 370/328 |
| 2007/0294710 | A1 | * | 12/2007 | Meesseman .................. 719/328 |

(Continued)

FOREIGN PATENT DOCUMENTS

| EP | 0275046 A2 | 7/1998 |
| WO | WO-2008/073205 A1 | 6/2008 |
| WO | WO-2009/151758 A1 | 12/2009 |

OTHER PUBLICATIONS

Control System for communication between Units European Patent Publication No. 0275076 B1. Published Jun. 15, 1994, Inventor Orita, Akira.*

(Continued)

*Primary Examiner* — Sargon Nano
(74) *Attorney, Agent, or Firm* — Thomas L. Ewing

(57) ABSTRACT

A common communications protocol is described among devices in a unified communications network. Native devices receive upstream commands and forward them to downstream devices without interpreting the commands. The native devices reformat commands intended for mapped devices in the unified communications network. The common communications protocol calls for left shifting address fields for transmitted commands until the command arrives at its intended destination.

22 Claims, 6 Drawing Sheets

(56) References Cited

U.S. PATENT DOCUMENTS

| | | |
|---|---|---|
| 2008/0043824 A1 | 2/2008 | Jacobs et al. |
| 2008/0044002 A1* | 2/2008 | Bevirt et al. ............... 379/430 |
| 2008/0108306 A1* | 5/2008 | Yee ........................... 455/41.2 |
| 2008/0207184 A1 | 8/2008 | Wassingbo et al. |
| 2008/0261529 A1* | 10/2008 | Rosenblatt ................. 455/41.3 |
| 2009/0305632 A1 | 12/2009 | Sarkissian et al. |
| 2009/0318081 A1 | 12/2009 | Winter |
| 2009/0320077 A1 | 12/2009 | Gazdzinski |
| 2010/0067723 A1* | 3/2010 | Bergmann et al. ............ 381/315 |
| 2010/0070266 A1 | 3/2010 | McNeill et al. |
| 2010/0118150 A1 | 5/2010 | Boland et al. |
| 2010/0118158 A1 | 5/2010 | Boland et al. |
| 2010/0159830 A1 | 6/2010 | Findlay et al. |
| 2011/0145842 A1 | 6/2011 | Tofighbakhsh et al. |
| 2011/0151788 A1* | 6/2011 | Castrogiovanni et al. ... 455/41.2 |
| 2011/0163949 A1* | 7/2011 | Chen et al. .................... 345/157 |
| 2011/0294423 A1 | 12/2011 | Lin |
| 2012/0143093 A1 | 6/2012 | Stirling et al. |
| 2012/0204216 A1 | 8/2012 | Connelly et al. |
| 2012/0288079 A1 | 11/2012 | Burnett et al. |

OTHER PUBLICATIONS

International Search Report and Written Opinion mailed Nov. 18, 2011, for international application No. PCT/US2011/042796.

* cited by examiner

| Presence Data Table | | | 195 |
|---|---|---|---|
| Medium | Available | Active | Preferred |
| Email 133 | Yes | Yes | Yes |
| VOIP 131 | Yes | Yes | No |
| IM 135 | Yes | Yes | No |
| SMS 141 | No | No | No |
| Mobile Telephony 105 | Yes | Yes | No |
| Wired Telephony 103 | Yes | Yes | No |
| Other 109 | No | No | No |

CONNECTION DEVICE AND PROTOCOL

CROSS-REFERENCE TO RELATED APPLICATIONS

This application is a divisional application of U.S. Utility application Ser. No. 12/828,655, filed Jul. 1, 2010, entitled "Connection Device and Protocol," which is incorporated herein by reference in its entirety for all purposes.

FIELD

Embodiments of the invention relate to systems and methods for communications among the devices in a network. More particularly, an embodiment of the invention relates to systems and methods that employ a communications protocol that simplifies communications among devices in a communications network where the devices employ a variety of communication mechanisms to facilitate their communications.

BACKGROUND

Unified communications represents an important component of productivity in contemporary business culture, and its success from company to company can serve as a bellwether indicator of the company's overall management success. An essential feature behind unified communications is the ability to have a single way for reaching an employee. Thus, in a fully configured unified communications environment, all messages to an employee, regardless of the format of their origin (e.g., e-mail) will reach the employee at the earliest possible moment via another format (e.g., SMS) if necessary.

Unified communications may include the integration of real-time communication services (e.g., instant messaging) with non-real time communication services (e.g., SMS). Unified communications systems typically comprise not a single system but the integration of data from a potentially unlimited set of separate communications devices and systems.

As a further representative example, unified communications permits one party (e.g., a co-worker) to send a message on one medium and have it received by another party on another medium. This process effectively transfers an activity from one communications medium to another. For example, a message recipient could receive an e-mail message from a co-worker and access it through a mobile phone.

Presence information refers to the combination of the availability of a communication recipient to be able to receive a message and that person's willingness to speak. For example, if the message sender is online according to the presence information and currently accepts calls, the response can be sent immediately through text chat or video call. Otherwise, the communication may be sent as a non real-time message that can be accessed through a variety of media. Thus, presence information typically represents a status indicator that conveys ability and willingness of a potential communication partner.

Difficulties arise in producing a unified view of data, such as presence information, when a party's communication media are spread across multiple and/or overlapping systems. When a user's communications environment comprises multiple devices, not all of which are aware of the others, then the unity among the devices of the user's communications network is incomplete. So, for example, a party's laptop computer might not know about the same user's mobile telephone. Consequently, the mobile telephone is not joined into the same effective communications network as the other devices associated with the laptop computer, and a presence system cannot integrate the mobile phone into the unified communications environment.

No protocol presently exists that can be used to facilitate communications between a personal computer (PC), a Bluetooth device, a DECT device, and/or Wi-Fi device without translating from one set of supported commands to another. Consider the example of a PC application that communicates to a dongle through defined HID events, and the dongle communicates with a headset over Bluetooth. In this example, commands that are sent by the PC are terminated on the dongle. The dongle itself must determine whether the commands are required to enable dongle functionality or to enable headset functionality. If the command is for the headset, the dongle must maintain a copy of the state of the headset, in order to provide the appropriate Bluetooth command to the headset.

To make the situation even worse, if an additional feature is added to the headset and the PC, then intervening communications devices such as the dongle would also need to be updated in order to provide the functionality.

Unified communications has analogs in the home consumer market as well. A home user may want to watch a television program or surf the Internet uninterrupted, provided that an incoming message is from anyone other than a specific person. The home user may be able control devices (e.g., a wired telephone) associated with the home cable network to implement the desired message routing, but this home cable network has no control over devices outside its network (e.g., the same person's mobile telephone).

Attempts to solve this problem in the prior art have tended to be either overly complicated, overly expensive, or both. For example, one of the preferred solutions in the prior art has been to supply all networked devices with complete topology information. This approach provides a working solution, of sorts, but unfortunately requires a tremendous amount of administrative overhead. Not only must every device understand the protocols for every device that could theoretically be connected into the network, each device has to be routinely updated to accommodate protocol updates in all of those devices.

Other solutions have proven equally inadequate or inappropriate for providing a robust unified communications systems. A simple and robust solution is called for in order to make unified communications more robust and ubiquitous.

SUMMARY OF THE INVENTION

Embodiments of the invention provide a computerized network comprising a protocol manager in a computer configured to coordinate communications among a plurality of associated devices by sending messages to associated devices in the plurality of associated devices, wherein the messages sent utilize a plurality of communication mechanisms. The computerized network further comprises a first associated device, electronically coupled to the protocol manager and configured to receive communications from the protocol manager, wherein the first associated device is further configured to interrogate a message address of a received communication and forward the message automatically to another associated device of the plurality of associated devices unless the message address indicates that the message is intended for the first associated device. The computerized network also includes a second associated device, electronically coupled to the first associated device and configured to receive communications from the protocol manager, wherein the second associated device is further configured to interrogate a message address of a received communication and forward the message automatically to another associated device of the plurality of associated devices unless the message address indicates that the message is intended for the second associated device. The computerized network additionally includes a third associated device, electronically coupled to the second associated device and configured to receive communications from the protocol manager.

Embodiments of the invention also provide a unified communications system, comprising a computerized protocol manager resident in a computer, the computerized protocol manager configured to access a first API translation unit and translate first device-specific commands into a common protocol and further configured to access a second API translation unit and translate second device-specific commands into the common protocol. The unified communications system also comprises a first device configured to receive commands formatted according to the common protocol, sort received commands into commands intended for the first device and intended for another device among a plurality of devices, and forward commands intended for another device of the plurality of devices. The unified communication system further comprises a second device configured to receive commands formatted according to the common protocol, sort received commands into commands intended for the second device or intended for another device among a plurality of devices, and forward commands intended for another device of the plurality of devices.

Embodiments of the invention provide a method for transmitting communications in a unified communications system. The method comprises accessing a first API translation unit by a computerized protocol manager in a computer and translating first device-specific commands for a first device into a common protocol. The method further comprises accessing a second API translation unit by the computerized protocol manager and translating second device-specific commands for a second device into the common protocol. The method also comprises receiving commands formatted in the common protocol from the protocol manager by a first device that sorts the received commands into commands intended for the first device or commands intended for another device of a plurality of devices, and forwards commands intended for another device of the plurality of devices to the another device of the plurality of devices. The method also comprises receiving commands formatted in the common protocol by a second device that sorts the received commands into commands intended for the second device or commands intended for another device among a plurality of devices and forwards commands intended for another device of the plurality of devices to the another device.

DETAILED DESCRIPTION OF AN EMBODIMENT OF THE INVENTION

Embodiments of the invention enable a virtually unlimited number of devices to be connected in a tiered tree-style network. For example, embodiments of the invention enable a personal computer to interrogate a conventional mobile phone via a USB dongle and a Bluetooth headset without requiring modifications to the conventional mobile phone.

Embodiments of the invention provide a relative topology for devices connected in a network. Thus, a typical device has a parent node above it in a communication hierarchy and up to 7 nodes below it in the hierarchy, according to an embodiment of the invention. Using this approach, a device only needs to know the address of the device above it and the addresses for the devices below it in order to communicate with other devices throughout the network. In short, a device needs to know just a relative topology and not the topology for the entire network. Intervening devices typically have little more to do than forward a command to the proper recipient above or below it.

Embodiments of the invention enable a device to send data, commands, and information to non-native devices without requiring intermediate devices to understand, translate or re-interpret the information sent. Embodiments of the invention support and enhance the establishment of a unified communication system by incorporating distant and non-network devices together into a common network. In short, embodiments of the invention may further facilitate establishing a single way to reach a user regardless of which communication devices he happens to be near and/or using.

Embodiments of the invention also enable communications across a variety of media types without each device in the system having to maintain network topology information about distant devices in the network. For example, embodiments of the invention may ensure that commands which are destined for a specific dongle only terminate at that dongle while other commands may be forwarded through the dongle to other devices. Thus, the dongle can forward headset-specific commands to a headset without the dongle needing to understand the forwarded commands. Since devices need only forward commands and are not necessarily required to interpret the commands, then it becomes possible to send instructions from a computer (or other top node of the network) to any other device on the network which is only understood by the target device. Finally, embodiments of the invention should simplify the operation of the network and device interconnections. New commands can easily be added to any device on the topology, without the need for any other devices to be upgraded.

Figure 1A:
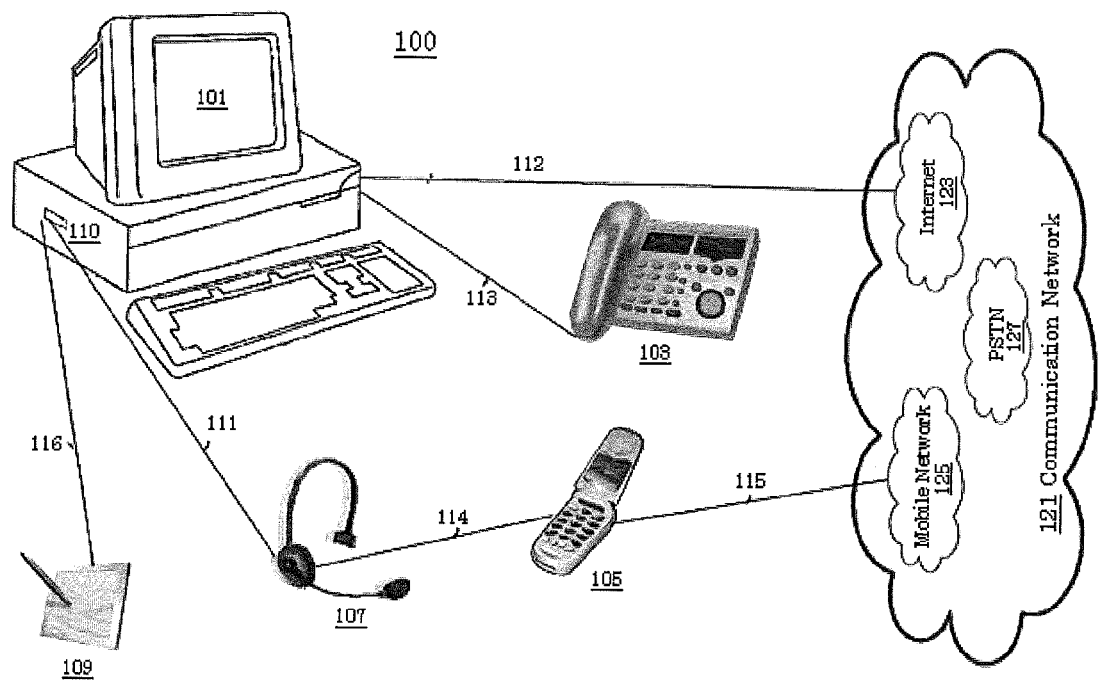
FIG. 1A illustrates a physical view of a unified communication network 100, according to an embodiment of the invention.

FIG. 1A illustrates a physical view of a unified communication network 100, according to an embodiment of the invention. The network 100 comprises a computer 101 that includes a variety of communications devices (e.g., VOIP 131 discussed below) configured for communications with other parties over an external communications network 121. The external communications network 121 may include an Internet 123, a mobile telephony network 125, and a public switched telephony network (PSTN) 127.

Figure 1B:
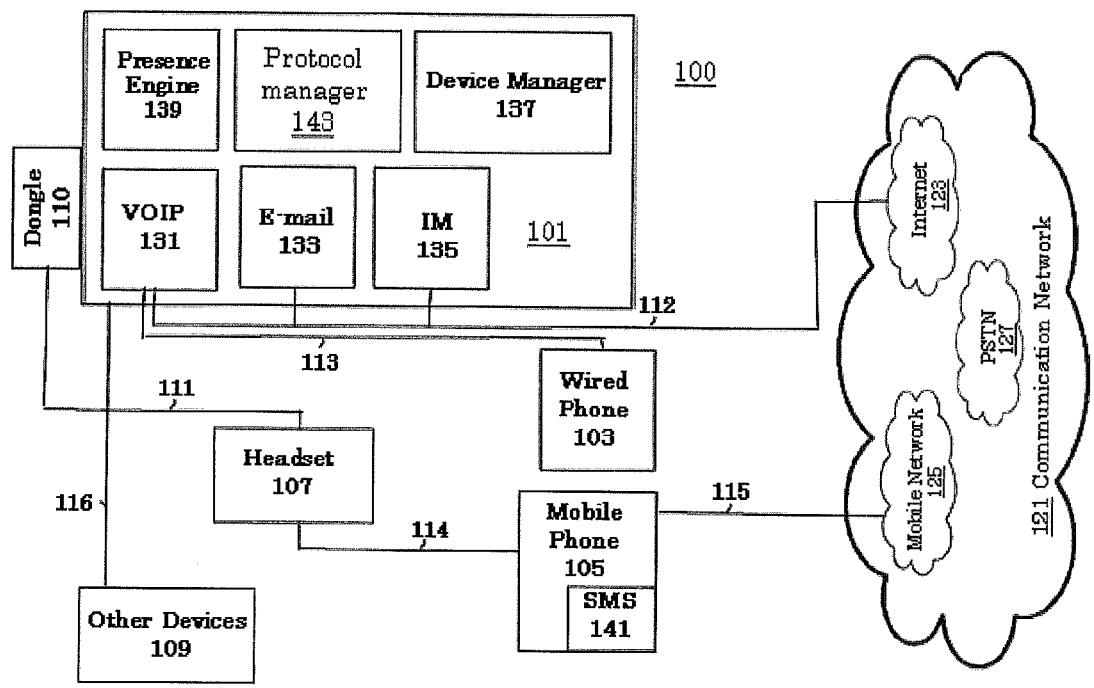
FIG. 1B illustrates a logical view of the unified communication network 100, according to an embodiment of the invention.

FIG. 1B illustrates a logical view of the unified communication network 100, according an embodiment of the invention. The computer 101 may include applications configured to communicate various data types (e.g., voice, video, and data) and in various formats. These applications may include an electronic mail system 133, a Voice over Internet Protocol (VOIP) communications system 131, and an Instant Messaging (IM) system 135, according to an embodiment of the invention. These applications may be comprised of software, hardware, and combinations of both. The computer 101 does not need to include all of these applications and may in many instances include fewer applications. Other computerized communication processes capable of providing useful information for a presence system may also be included within the computer 101.

The network 100 may also include a wired telephone 103, a mobile telephone 105, and a headset 107, according to an embodiment of the invention. The mobile telephone 105 may include a Short Message Service (SMS) capability 141, as well as other communications applications.

The computer 101, the wired phone 103, and the mobile phone 105 are all connected to the communications network 121. While the computer 101 would typically connect directly to the communication network 121 via the Internet 123, different connections are known in the art and may be employed within the spirit of the invention. The wired phone 103 as shown in FIG. 1B is connected to the computer 101 and provides a device for communicating over the VOIP 131. As known in the art, the wired phone 103 could also connect to the communication network 121 via the PSTN 127. While not shown here, such a connection would be within the spirit of the invention.

A user associated with the network 100 may communicate with other parties using the devices in the network 100 (e.g., the voice over internet protocol (VOIP) 131, electronic mail (email) 107, instant message 107, the wired phone 103, short message service (SMS) 141, and the mobile phone 113. Communication messages may travel from one portion of the communications network 121 to another portion of the communications network 121. For example, a person on a wired phone connected to the PSTN 127 may communicate with a user of the VOIP 131 and vice versa, and an SMS sent from a third party's mobile phone may arrive on the email system 133 (or the IM 135) and vice versa.

The mobile telephone 105 and its applications conventionally communicate directly with a mobile network 125 associated with the communication network 121, and the mobile telephone 105 does not typically connect to the communication network 121 via the computer 101 but may connect with the headset 107 to provide greater user comfort and/or hands free use. The mobile telephone 105 could alternatively connect to the communications network 121 via the computer 101, such as in conjunction with the VOIP 131. Wireless communications to the headset 107 can be piped on a dongle 110 to the computer 101 and applications on the computer (e.g., the VOIP 131). As discussed herein, such an embodiment could be enabled via the headset 107 for outbound calls on many models of mobile phones.

With the assistance of a mobile telephone operator associated with the mobile telephone 105, an embodiment of the invention could also be enabled that would allow inbound calls to reach the mobile telephone 105 via the Internet 123 and routed through the computer 101. The mobile telephone operator would typically configure its systems to route inbound calls to the mobile telephone 105 over the Internet 123 to the VOIP 131 (or similar functionality). The VOIP 131 would then route the calls to the mobile telephone 105 via the headset 107.

The network 100 may also include other types of communications devices 109. These other devices 109 may include but are not limited to devices such as a personal digital assistant (PDA) and/or a radio device, such as a hand-held radio transceiver. The other devices 109 include may comprise both native devices and non-native, mapped devices, as discussed below.

The various communication devices in the network 100 may not originate from a common manufacturer and might not be organically configured to communicate universally with each other. In some instances, the devices may be configured to communicate with each other only by virtue of the sharing of technical information between the respective manufacturers of the devices.

The headset 107 typically has a greater intrinsic ability to communicate with other devices associated with the network 100. For example, the manufacture of the mobile phone 113 may provide sufficient information to enable the manufacturer of the headset 107 to enable the two devices to communicate with each other. The headset 107 may translate data and commands received from the computer 101 before sending them to the mobile phone 105, which is often a non-native device for the computer 101. The manufacture of the mobile phone 105, for example, may have shared a key communications application program interface ("API") with the manufacturer of the headset 107. Such corporate relationships may be somewhat tenuous and unsteady. Likewise, the manufacturer of the headset 107 may not necessarily receive changes/updates to the communications protocols used by the mobile phone 105.

Embodiments of the invention provide a specialized communications protocol that facilitates communications among the devices in the network 100. This communication protocol, dubbed here the Olympia Link Protocol, provides an expandable network hierarchy, according to an embodiment of the invention. The network topology in the network 100 preferably comprises 4 layers of hierarchy but may be configured to have more or fewer layers within the spirit of the invention.

By employing the Olympia Link Protocol, each physical device in the network 100 only needs to connect to another physical device immediately above or below it, according to an embodiment of the invention Implementations of the Olympia Link Protocol provide communication between indirectly attached devices using command forwarding via the intermediate levels, according to an embodiment of the invention.

The protocol manager 143 serves as a master control for the Olympia Link Protocol in the network 100, according to an embodiment of the invention. Each supported device typically operates as a slave to the protocol manager 143, at least with respect to communications within the network 100, according to an embodiment of the invention. The native devices supported by the protocol manager 143 are typically capable of two-way communications with the protocol manager 143.

The Olympia Link Protocol does not typically need to specify the type of connection, or communication mechanism, between physical devices. The type of connection is independent of the Olympia Link Protocol. Accordingly, physical devices may communicate using communication mechanisms such as USB HID, DECT, Bluetooth, Wi-Fi, wUSB and Serial Port. The devices included in the network 100 typically adhere to a variety of standard communications technology and protocols. If two devices both practice the same communication standard (e.g., 802.11), then the two devices may be able to communicate with each other without additional re-configuration being performed on either device.

The Olympia Link Protocol specifies an addressing structure, such that only the recipient device in the network 100 needs to understand commands sent to it. Other physical devices in the topology of the network 100 merely need to forward commands and events to either the computer 101 or the physical device recipient of a communication. Each native device merely needs to pass commands forward, albeit perhaps on a different connection type, as discussed above.

If the computer 101 needs to communicate with the mobile phone 105, the computer 101 sends a message to the dongle 110 using an appropriate communications protocol, such as Universal Serial Bus (USB). The dongle 110 may convert the received command from a USB command to a command in another protocol such as a Digital Enhanced Cordless Telecommunications (DECT) command and forward it to the headset 107. The dongle 110 does not need to interpret the message. The headset 107 may convert the received command from DECT to another communications protocol such as Bluetooth before forwarding the communication to the mobile phone 105. The headset 107 does not otherwise need to interpret the command. The mobile phone 105 receives the command and acts upon it.

Commands sent through the network 100 may be encapsulated in a variety of formats, including known formats such as ASCII, according to an embodiment of the invention. The Olympia Link Protocol enables a common command protocol to be operated by all devices and reports connections and statuses of any device.

Figures 1C, 1D:
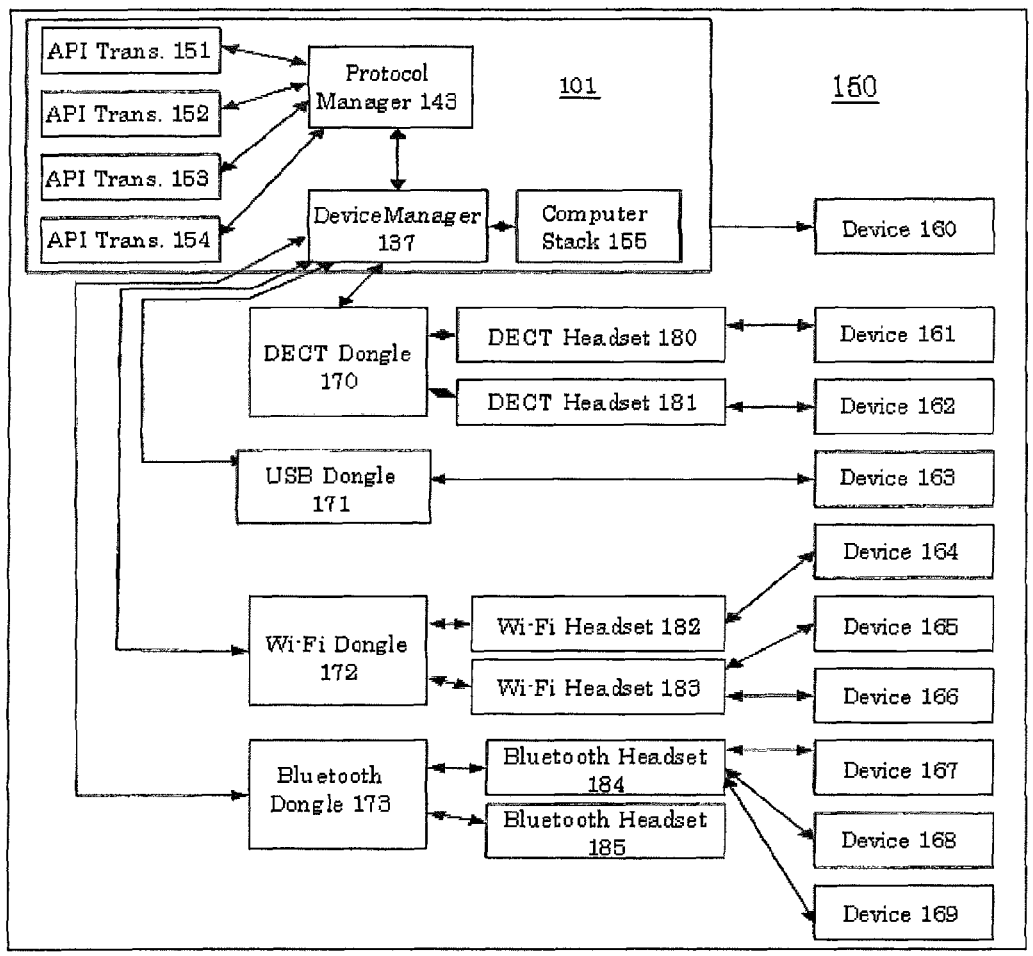
FIG. 1C illustrates a network 150 adapted for a variety of devices, according to an embodiment of the invention.
FIG. 1D illustrates a table 195 that may be helpful to a unified communications system provided by the presence engine 139, according to an embodiment of the invention.

FIG. 1C illustrates a network 150 adapted for a variety of devices, according to an embodiment of the invention. As shown in FIG. 1C, the network 150 has been configured to provide communications to dongles operating on four different protocols, a DECT dongle 170, a USB dongle 171, a Wi-Fi Dongle 172, and a Bluetooth dongle 173.

Operations of the protocol manager 143 in carrying out the Olympia Link Protocol may be facilitated by API translation modules 151-154 that each respectively provide an API for a given external device (e.g., the dongle 110) and include a translation for the API into a common API. The device manager 137 may use an API translation module in implementing the Olympia Link Protocol, according to an embodiment of the invention. For example, the API translation module 151 may provide a translation for the USB dongle 171.

The device manager 137 controls the devices in the network 100 and interacts with the protocol manager 143 in preparing and sending commands to the devices within the network 150. The device manager 137 has been configured to communicate directly with native devices in the network 150.

The protocol manager 143 includes (and/or accesses) a variety of manufacturer-specific application programming interfaces (APIs) for at least some of the devices included in the network 150. The inclusion of an appropriate device API (e.g., API translation module 152) changes the device from a mapped device into a native device, at least in terms of the protocol manager 143. When the protocol manager 143 has access to a device's API, then the protocol manager 143 can translate manufacture-specific commands into a common set of commands, including commands that effectively implement the Olympia Link Protocol. This approach also provides a fairly simple capability for updating the protocol manager 143 when one of the API's changes and also allows for the incorporation of new devices into the network as native devices.

FIG. 1C also shows various devices attached to the network 150. The dongles 170-173 connect to headsets 180-185. The headsets 180-185 operate according to different communications standards, e.g., Wi-Fi headset 182. These headsets in turn communicate with a variety of devices 161-169. These devices may include devices such as the mobile phone 105.

The protocol manager 143 has also been configured to obtain information, such as status data, from additional devices (e.g., the mapped devices) that are not directly connected to the device manager 137. So, for example, the protocol manager 143 would typically be configured to obtain information from the mobile phone 105, according to an embodiment of the invention.

A presence engine 139 may retain presence information for the native devices within the communication range of the computer 101. In some embodiments of the invention, the presence engine 139 on the computer 101 may also retain information for the non-native, mapped devices, such as the mobile phone 105, by using the relationship between the headset 107 and the mobile phone 105.

FIG. 1D illustrates a table 195 that may be helpful to a unified communications system provided by the presence engine 139, according to an embodiment of the invention. The table 195 provides presence status information for the various communications devices/technologies in the network 100. The first column indicates whether a given device is available for communication. For example, the SMS 141 is not available. This could mean that the program has not been actuated by a user of the mobile phone 105 or it may mean that the SMS 141 is otherwise not operating. The next column indicates which program are presently active, e.g., being used to one degree or another. Finally, the user may have indicated a preference for communications given his present status. For example, the user may be too busy to take a telephone call via any medium that is live, and consequently has indicated a preference for electronic mail 133.

Figure 2A:
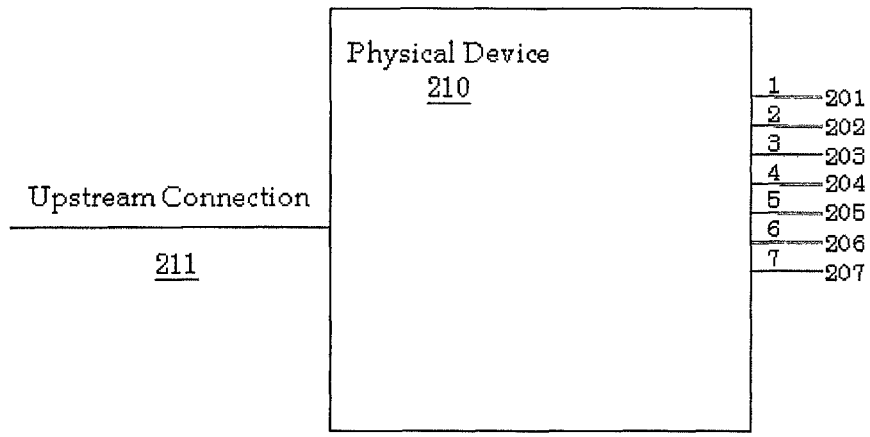
FIG. 2A illustrates a physical device 210 and its upstream and downstream connections, according to an embodiment of the invention.

FIG. 2A illustrates a physical device 210 and its available upstream and downstream connections, according to an embodiment of the invention. The physical device 210 may represent individual communications components, such as those shown in FIG. 1A, like the dongle 110, the headset 107, and the telephone 103. As shown in FIG. 2A, the physical device 210 receives communications from an upstream connection 211. In this embodiment, the physical device 210 is embedded in a network topology such that the physical device 210 has just one upstream communication. In alternative embodiments, the physical device 210 could be configured to have multiple upstream connections. The physical device 210 may communicate with up to 7 downstream devices via connections 201-207, according to an embodiment of the invention. Downstream devices may represent any type of device capable of communicating with the physical device 210 over one of the connections 201-207. For example, the physical device 210 may represent the dongle 110 and the downstream connection 204 may represent the connection 111 shown in FIG. 1 between the dongle 110 and the headset 107. In this configuration, a device upstream of the physical device 210 may send a command for processing on a physical device that is downstream of the physical device 210 with the physical device 210 relaying the command to the downstream device, according to an embodiment of the invention.

Figure 2B:
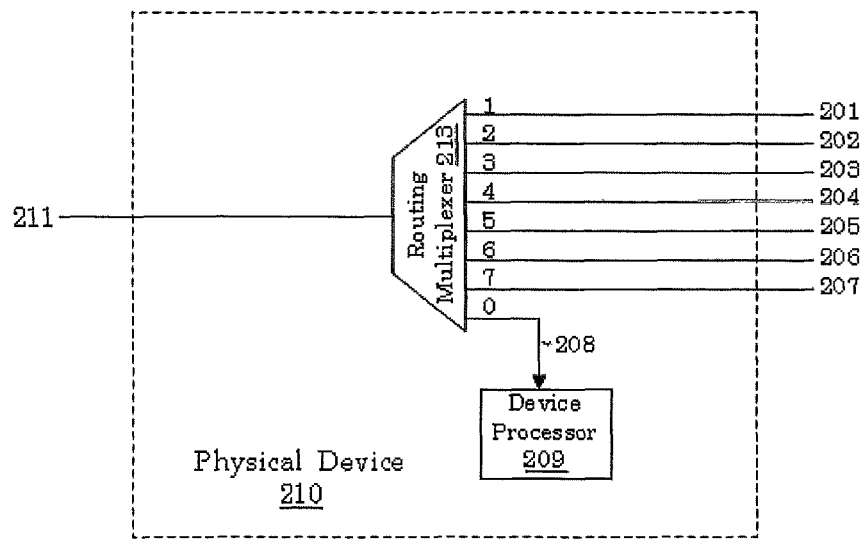
FIG. 2B illustrates a further representation of the communications routing structure shown in FIG. 2A, according to an embodiment of the invention.

FIG. 2B illustrates a further representation of the communications routing structure shown in FIG. 2A, according to an embodiment of the invention. As shown in FIG. 2B, the physical device 210 includes a routing multiplexer 213. The routing multiplexer 213 is configured to receive communications from the upstream connection 211 and process information found in an addressing field of the received communication.

Assume the routing multiplexer 213 has received a communication from the upstream connection 211 having an address "0000". Since the initial integer in the address is "0," then the routing multiplexer 213 passes the command along path 208 to the device processor 209 for processing on the physical device 210. Now assume that a communication received from the upstream connection 211 has an address "4300." Since the initial integer in the address is something other than a "0," then the upstream command is intended for processing on another device downstream of the physical device 210. In this example, the routing multiplexer 213 determines that the downstream device is reachable via downstream connection 204, which corresponds to the routing address "4" of "4300." Before forwarding the message along downstream connection 204, the routing multiplexer left shifts the received address such that the downstream device found along the downstream connection 204 will receive the address "3000" rather than "4300." Likewise, this downstream device will find that the leading address digit is not "0" but a "3" and will forward the command to yet another downstream device having a connection address that corresponds to the "3" of "4300."

The physical device 210 may comprise any multipoint device, according to an embodiment of the invention. The upstream connection 211 and the downstream connections 201-207 may represent any type of communications mechanism, including mobile communications mechanisms like Wi-Fi and Bluetooth. The physical device 210 may also be configured to support a media connect device that allows new devices to be connected into a network topology, such as the topology for the network 100 in FIG. 1A.

The routing multiplexer 213 may process more than one upstream connection and may process more than 7 downstream connections in alternative embodiments of the invention. In still other embodiments of the invention, the routing multiplexer 213 may route to fewer than 7 downstream devices. The routing multiplexer 213 may be comprised of specialized hardware configured to perform a multiplexing task or specialized computer software configured for such a task and/or a hybrid that comprises both computing hardware and software working together to perform the routing function.

Figure 3A:
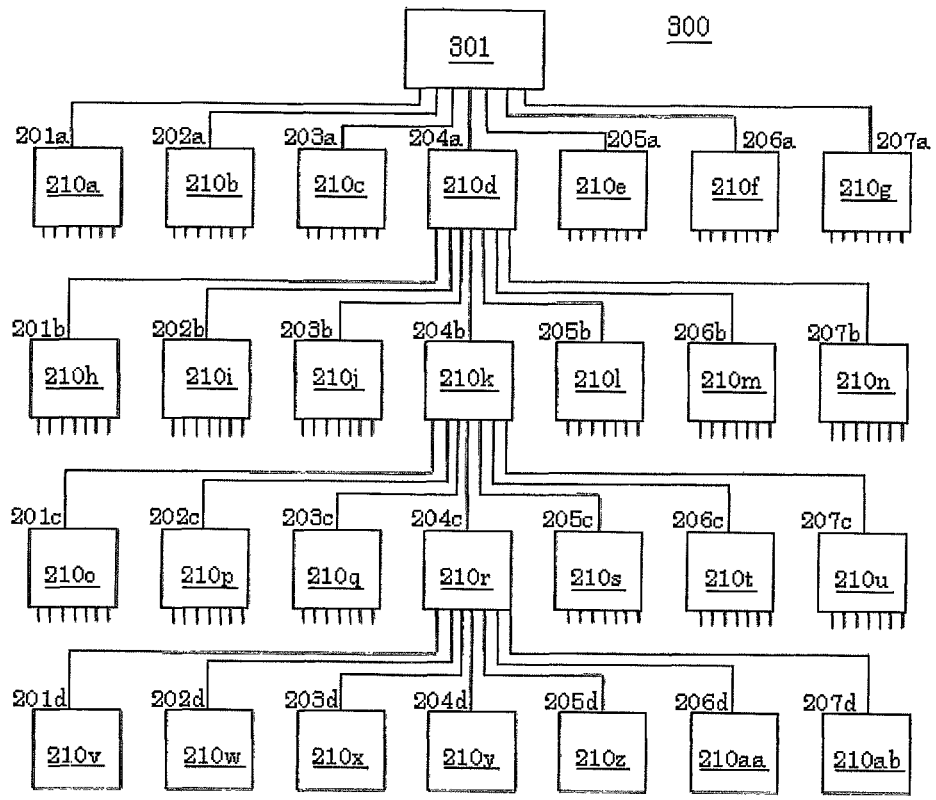
FIG. 3A illustrates a network topology for a communication network 300, according to an embodiment of the invention.

FIG. 3A illustrates a network topology for a communication network 300, according to an embodiment of the invention. The topology of the network 300 comprises a series of physical devices 210 as shown in FIG. 2A connected together to form a communication network 300. In the network 300, messages may be communicated downward from a top node 301 to a lowest level of networked physical devices (shown here as devices 210v-210ab), according to an embodiment of the invention. Similarly, the physical devices at the lowest level may send messages up the communications channel to the top node 301, according to an embodiment of the invention. The top node 301 comprises a device (e.g., the computer 101) that performs and/or facilitates the operations of the Olympia Link Protocol.

The network 300 illustrated in FIG. 3A depicts physical devices 210 at their greatest possible extent along only one of seven topology paths: top node 301 to physical device 210d to physical device 210k to physical device 210r and to the seven physical devices 210v-210ab. The network 300 could include up to $7^4+7^3\times 7^2\times 7=2,800$ physical devices. Only 28 physical devices 210 have been shown here for clarity purposes.

In a network where messages and commands are passed from one device to the next, each physical device 210 needs to have some information about the network's topology. As mentioned above, one of the problems with conventional approaches is that each physical device in a network typically needs to know the topology for the entire network and how to communicate to each device in the network. The physical devices 210 in the network 300 need only know a relative network topology, such as the topology shown in FIG. 2A: one respective upstream connection and up to seven respective downstream connections, according to an embodiment of the invention.

As previously discussed, the addressing scheme used in the Olympia Link Protocol comprises progressively left shifting a message's address until the address reaches a "0" which indicates the recipient of the communication who will be responsible for its processing. Following this scheme, a physical device 210 does not need to know where it lies within the network topology and only needs to know where it lies within the relative topology described in FIG. 2A.

Figure 3B:
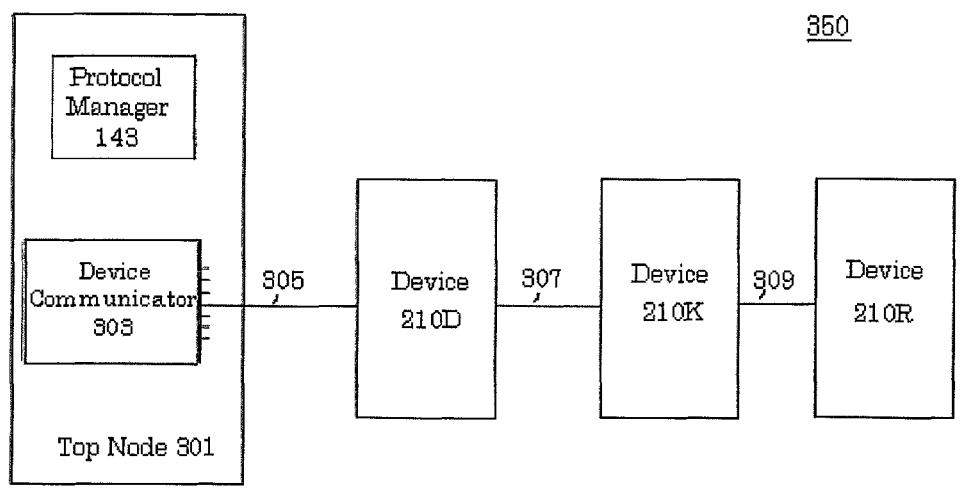
FIG. 3B illustrates a network 350 of interconnected devices, according to an embodiment of the invention.

FIG. 3B illustrates a network 350 of interconnected devices, according to an embodiment of the invention. The protocol manager 143 provides the Olympia Link protocol to a communications manager 303 located in the top node 301 (e.g., the computer 101). This is the highest link in the network topology in this embodiment of the invention. The protocol manager 143 includes (and/or accesses) a variety of manufacturer-specific application programming interfaces (APIs) for at least some of the devices included in the network 350.

Assume that the devices connected in the network 350 comprise the top node 301, a first device 210d (e.g., the dongle 110), a second device 210k (e.g., the headset 107), and a third device 210r (e.g., the mobile telephone 105). Assume further that the connections between these devices comprise a first connection 305 (e.g., a USB connection) between the top node 301 and the first device 210d, a second connection 307 (e.g., Bluetooth connection) between the first device 210d and the second device 210k, and a third connection 309 (e.g., a Bluetooth connection) between the second device 210k and the third device 210r.

In this configuration, communications travel from the protocol manager 143 through the communication manager 303 to the first device 210d, then to the second device 210k, and finally the third device 210s. (Of course, not all communications will necessarily travel the entire length of the network 350.) For example, assume that the Olympia Link protocol on the device 210d analyzes a received communication from the top node 301 and determines that the address does not have a leading "0." The device 210d left shifts the address of the received message by one place, determines that that the communication has an address for the device 210k, and forwards the communication to the device 210k using the connection 307. The device 210k also determines that the message is destined elsewhere because the address does not have a leading "0." The device 201k left shifts the address by one place and sends it to the device 210r. The device 210r is a mapped device and processes the received communication as if it originated from the device 210k, according to an embodiment of the invention.

Figure 4:
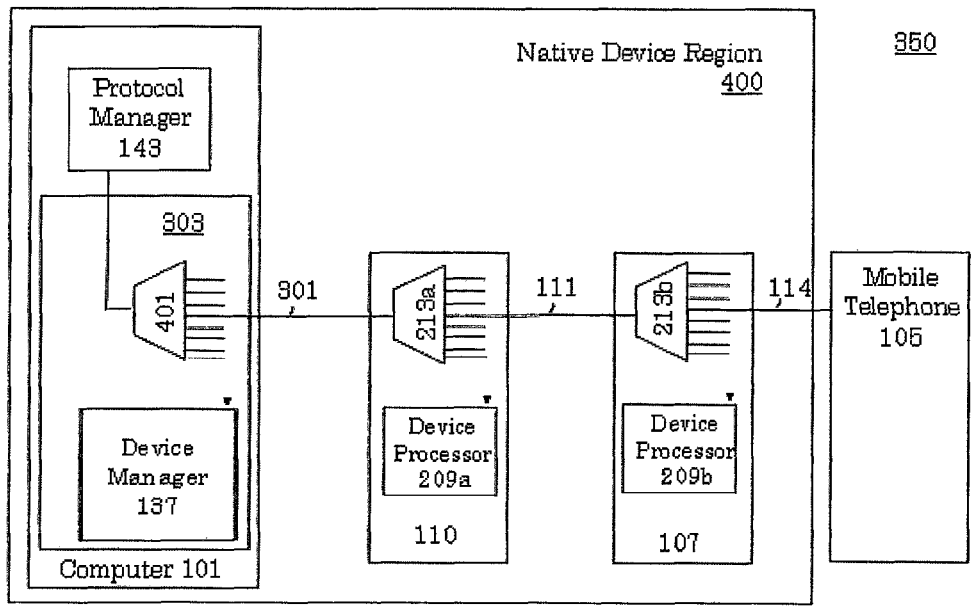
FIG. 4 further illustrates routing interconnections in the network 400, according to an embodiment of the invention.

FIG. 4 further illustrates routing interconnections in the network 400, according to an embodiment of the invention. The Olympia Link protocol works with both native devices and mapped devices. From the viewpoint of the computer 101, the mobile phone 105 is a mapped device, as it is not native to the computer 101. Mapped devices represent devices connected to the network 400 that do not support the Olympia Link Protocol. By contrast, the headset 107 is a native device because the headset 107 has the capability to process commands according to the Olympia Link protocol.

A native devices area 400 marks a zone in which the devices (shown here as the dongle 110 and the headset 107) have an organic capability to support the Olympia Link Protocol. These native devices have a communications channel established with the protocol manager 143. Communications mechanisms configurable to support connections between native devices and the Presence Engine 139 in the network 400 include but are not limited to USB, Bluetooth, Wi-Fi, and DECT.

For a mapped device, such as the mobile phone 105, to be present in the network 400, the device should have a connection to a native device. For example, the mobile phone 105 shown in FIG. 4 is connected electronically to the headset 107. Examples of mapped devices include but are not limited to third-party devices and legacy devices that have not been provided with the Olympia Link Protocol.

FIG. 4 further illustrates how communications may pass from the protocol manager 143 to the mobile phone 105, a mapped device, using the Olympia Link Protocol, according to an embodiment of the invention. The protocol manager 143 in the computer 101 communicates a command to a multiplexer 401 in the device communicator 303. Assume that the address for the message is "4440." Because the message address does not begin with a 0, the multiplexer 401 will not send the command to the device manager 137 on the computer 101. In general, if the device address is other than "0," then the multiplexer 401 determines the device associated with the address. Here, the multiplexer 401 essentially ignores the device manager 137 and forwards the message on to the dongle 110. The dongle's multiplexer 213a will likewise not pass the message to its device processor 209a but will instead notice the second "4" in the address (i.e., 4400) and forward the message to the headset 107. The headset multiplexer 213b will likewise not pass the message to its device processor 209b but will instead notice the third "4" in the address (i.e., 4440) and forward the message to the mobile phone 105. The mobile phone 105 is a mapped device and not a native device and will simply receive the communication as if it originated from the headset 107 and not from the protocol manager 143. The mobile phone 105 then processes the received command.

As shown in FIG. 4, the routing information for the devices shown is:

| Device | Routing Information |
| --- | --- |
| Device Manager 137 | 0000 |
| Bluetooth Dongle 110 | 4000 |
| Bluetooth Headset 107 | 4400 |
| Mobile Phone 105 | 4440 |

Other addressing schemes and assignments are possible within the spirit of the invention.

Each multiplexer essentially left shifts the received address after processing. Assume, for example, that the address is "4400," which will ultimately connect to the headset 107. The multiplexer 401 identifies the leading "4" in the address and forwards the command to the dongle 110. Before forwarding the command, the multiplexer 401 left shift the address "4400" such that it now becomes "4000". The dongle 110 receives the message and the multiplexer 213a identifies that the leading "4" in the address corresponds to the headset 107. The multiplexer 213a left shifts the address "4000" before sending the command to the headset 107, such that the address "4000" now becomes "0000." The headset 107 receives a command having the address "0000." The multiplexer 213b identifies the leading "0" in the command and forwards the command to the device processor 209b for further processing.

Figure 5:
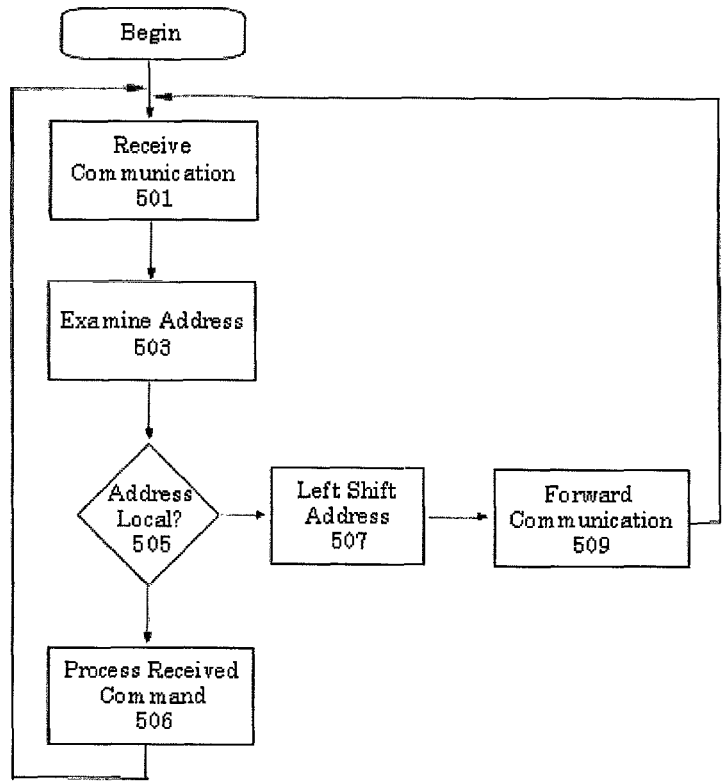
FIG. 5 provides a flowchart of the process performed by a physical device (e.g., the physical device 210 shown in FIG. 2A) when it receives a new communication, according to an embodiment of the invention.

FIG. 5 provides a flowchart of the process performed by each physical device (e.g., the physical device 210 shown in FIG. 2A) when it receives a new communication, according to an embodiment of the invention.

A physical device receives a new communication (step 501). The device examines the received communication (step 503) and asks if a leading portion of the address is "0" or another number (step 505). If the address portion is "0," then this indicates that the message is a local message intended for the device itself. Accordingly, the Olympia Link Protocol forwards the received communication to an appropriate processor (e.g., the device processor 209a) within the physical device (step 506) and then returns to await additional inbound communications for processing.

If the communication has a leading address portion other than "0" (step 505), then the Olympia Link Protocol forwards the communication to the physical device having that address, according to the physical device's network topology (step 509). Before forwarding the communication to another physical device, the Olympia Link Protocol left shifts the communication's address by one addressing increment (step 507). So, for example, an address that was "3400" becomes "4000," according to an embodiment of the invention. After forwarding the communication (step 509), the Olympia Link Protocol then returns to wait for the next received communication (step 501).

Although the Olympia Link Protocol has been designed primarily with business applications in mind, embodiments of the invention may also find uses in consumer electronics applications as well, particularly home entertainment and communications systems.

Figure 6A:
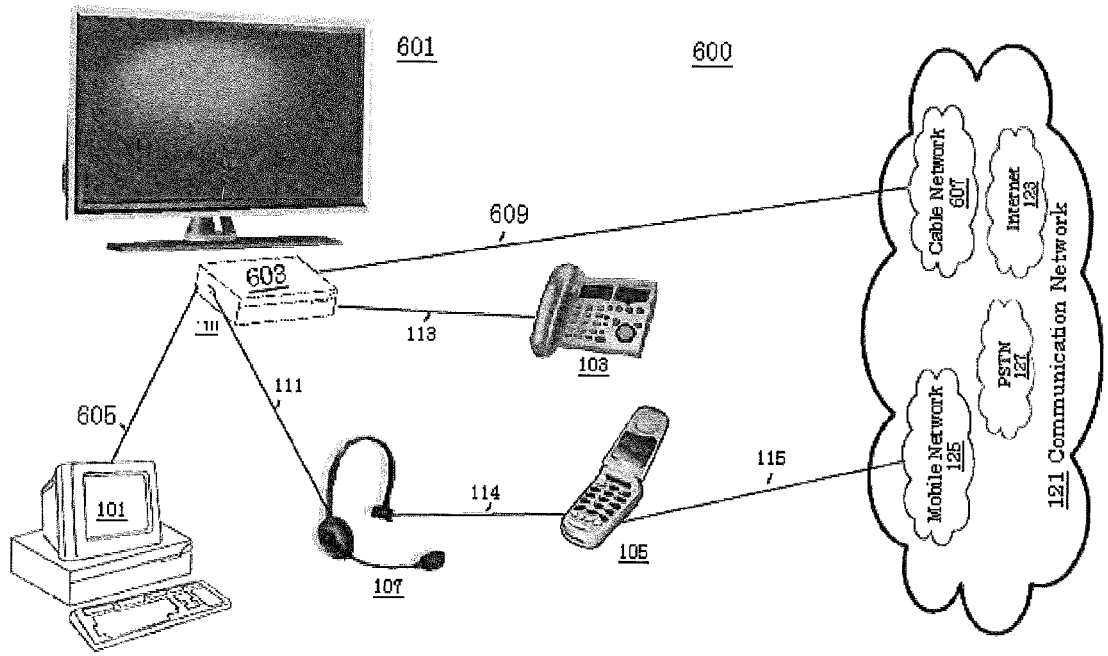
FIG. 6A illustrates an embodiment of the invention implemented in conjunction with a conventional cable television installation.

FIG. 6A illustrates an embodiment of the invention implemented in conjunction with a conventional cable television installation, sometimes known as "triple play," in which the cable user receives Internet, telephony, and television services via a single cable operator.

As shown in FIG. 6A, a home network 600 comprises a set-top box 603, a television 601, the wired phone 103, the headset 107, the mobile phone 105, and the computer 101. The set-top box 603 connects to the communication network 121 via a cable network 607. Devices connected downstream of the set-top box 603 may connect with other networks beyond the cable network 607. For example, applications on the computer 101 may connect through the set-top box 603 to the cable network 607 and then to the Internet 123. The wired phone 103 may connect to the set-top box 603 then to the cable network 607 and then to the PSTN 127 and/or to the mobile network 125. The television 601 may connect through the set-top box 603 to the cable network 607 from which the television 603 receives a television signal (via a cable headend). Other configurations are also possible within the spirit of the invention.

The set-top box 603 serves as the top node (e.g., the top node 301) in the network topology for the network 600. In this embodiment, the set-top box 603 includes a protocol manager 143 configured to maintain network communications according to the Olympia Link Protocol. (According to another embodiment of the invention, the computer 101 serves as the top node for the Olympia Link Protocol.) One typical advantage for using the set-top box 603 as the top node in the network is that the set-top box 603 is typically the only device in the network 600 that must remain switched on at all times in order for the network 600 to function properly. The user may, for example, switch off the computer 101.

The headset 107 may connect to the set-top box 601. The connection may be via a Bluetooth device, a wired connection, or another type of connection. The headset 107 may include functionality for communicating with and/or complementing the wired phone 103. For example, a call placed to the wired phone 103 may be answered by the headset 107.

Communications may transpire among the devices shown in this network topology in a manner similar to that described above for the typical business environment described in FIGS. 1A-1C. For example, a user may receive a call via the mobile phone 105. Information such as the Caller ID associated with the call may pass through the headset 107 to the set-top box 603. The set-top box 603 may send the Caller ID to the television 601 for display to the user. The user may actuate the headset 107 (and/or his cable TV remote) to either accept the call or send it to voicemail if the user does not want to be interrupted (e.g., the user is watching a rugby final on the television 601 and cannot be disturbed by his mother-in-law). The set-top box 603 may even include functionality that would allow the call to be received via the headset 107 or the wired phone 103. In other words, the user might be able to answer the mobile phone 105 on the wired phone 103. This could be helpful in instances where the user's mobile phone 105 has been placed in an inconvenient location. Conventional communications arrangements would typically allow the user to accept the call on the headset 107.

Thus, without having his television program interrupted, the user can see the Caller ID on his television screen and determine if he wants to take the call or send it to voicemail. The user could accept the call or reject the call by either operating the mobile phone 105 or by operating his headset 107 or his television remote control, according to an embodiment of the invention. If the user accepts the call, then the television 601 may be configured to mute itself and the call would connect through the headset 107, according to an embodiment of the invention.

Still further embodiments of the invention would allow the user to place an outbound call on the mobile phone 105 via the cable network 607. So, for example, if the user's mobile phone 105 is within range of a native device for the network 600, then the user's outgoing mobile phone call could be intercepted and routed through the cable network 607. This configuration might provide the user with lower cost telephony services in some instances, especially where the user's mobile telephone calls are individually charged while the user's wired or VOIP telephone calls are charged at a flat rate per month, as is frequently an option with telephony services provided by cable operators.

Figure 6B:
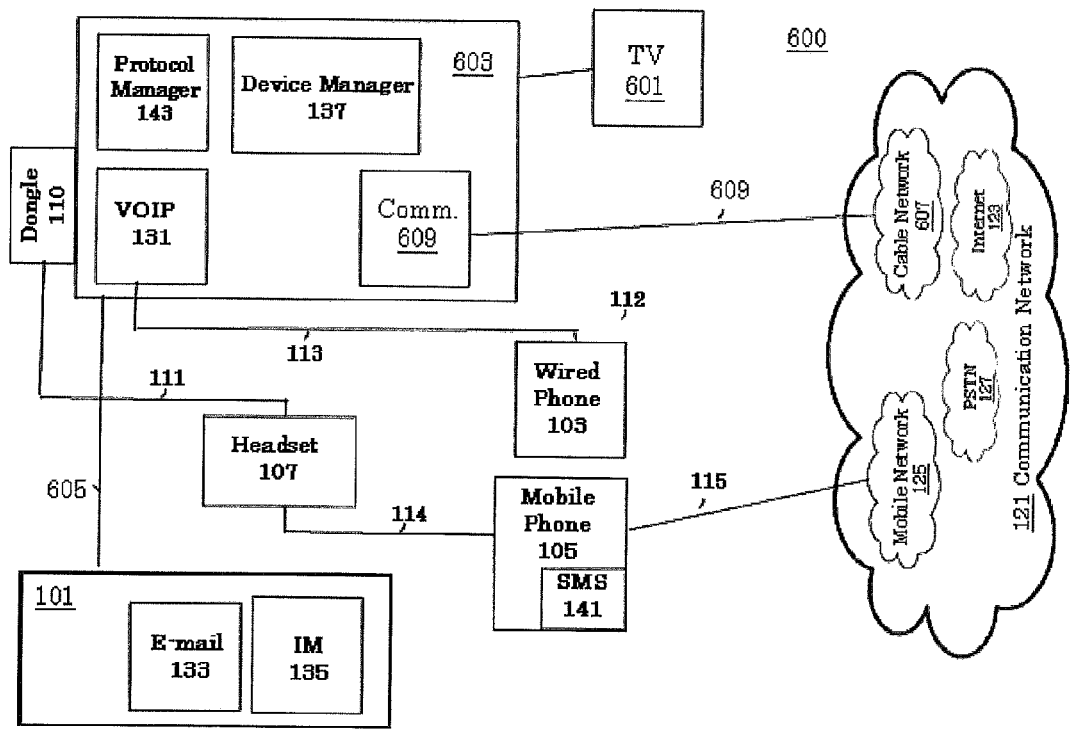
FIG. 6B provides a functional diagram of a network 600, according to an embodiment of the invention.

FIG. 6B provides a functional diagram of the network 600, according to an embodiment of the invention. As shown in FIG. 6B, the computer 101 may include communications application such as e-mail 133 and IM 135. Likewise, the mobile phone 105 may include the SMS 141. As shown in FIG. 6B, the VOIP 131 is located in the set-top box 603 and used to provide communications for the wired phone 103, according to an embodiment of the invention. A second VOIP might alternatively be provided in the computer 101. For example, the VOIP 131 in the set-top box 603 would typically be provided by the cable company while a VOIP on the computer 101 would typically be provided by a third party, and both systems might have considerably different rate structures.

The configuration shown in FIG. 6B could also be used to provide a facility for displaying email, IM, and/or SMS messages on the television 601. Such functionality could be enabled by using the Olympia Link Protocol in the manner described above for mobile telephony communications.

In a further embodiment of the invention, the communication link typically provided between the mobile phone 105 and the headset 107 could be provided by other devices. In such an embodiment, the mobile phone might be able to maintain communications directly with the set-top box 603, for example. In this embodiment, the user would not necessarily need to have the headset 107 in order for the overall network to integrate the mobile phone 105 into the network 600. For example, the network 600 could be configured such that the user could answer mobile telephone calls via his cable remote control with audio sent through systems associated with the television 601.

While specific embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification, but should be construed to include all systems and methods that operate under the claims set forth hereinbelow. Thus, it is intended that the invention covers the modifications and variations of this invention provided they come within the scope of the appended claims and their equivalents.

We claim:

1. A computerized network having devices that reside in a network having a topology, comprising:
    a computerized protocol manager in a computer configured to coordinate communications among a plurality of associated devices by sending messages to associated devices in the plurality of associated devices, wherein the messages sent utilize a plurality of communication mechanisms;
    a dongle, electronically coupled to the computerized protocol manager and configured to receive communications from the computerized protocol manager, wherein the dongle is further configured to interrogate a message address of a received communication and forward the message automatically to another associated device of the plurality of associated devices below the dongle in the network topology unless the message address indicates that the communication is intended for the dongle wherein the dongle's understanding of network topology consists of the computer and the devices of the network topology immediately below the dongle in the network topology;
    a headset, residing below the dongle in the network topology and electronically coupled to the dongle and configured to receive communications from the computerized protocol manager, wherein the headset is further configured to interrogate a message address of a received communication and forward the communication automatically to another associated device of the plurality of associated devices unless the message address indicates that the communication is intended for the headset wherein the headset's understanding of network topology consists of the dongle and the devices of the network topology immediately below the headset in the network topology; and a third associated device, electronically coupled to the headset and configured to receive communications from the computerized protocol manager, wherein the headset is a native device to the computer and the third associated device is a mapped device to the computer such that the headset formats communications in a communication mechanism acceptable by the third associated device.

2. The network of claim 1 wherein the plurality of communication mechanisms comprises at least two of Wi-Fi, Bluetooth, DECT, USB HID, wUSB and serial port.

3. The network of claim 1 wherein the third associated device is further configured to interrogate a message address of a received communication and forward the communication automatically to another associated device of the plurality of associated devices unless the message address indicates that the communication is intended for the third associated device; and a fourth associated device, electronically coupled to the third associated device and configured to receive communications from the computer.

4. The network of claim 1 wherein the third associated device comprises a mobile telephone.

5. The network of claim 4 wherein the dongle communicates with the computer using DECT as a communication mechanism, the headset uses Bluetooth as a communication mechanism with the dongle, and the mobile phone uses Bluetooth as a communication mechanism with the headset.

6. The network of claim 1 wherein the computer further comprises a presence engine and communications among the computerized protocol manager, the dongle, and the headset relate to the transmission of presence data associated with the presence engine.

7. The network of claim 1 wherein the computer resides in a television set-top box and the third associated device comprises a mobile telephone.

8. The network of claim 1 wherein the dongle interrogates the message address by examining a first portion of the message address and determining if the first portion of the message address matches a local address.

9. The network of claim 8 wherein the first portion of the message address comprises a first integer number and the local address comprises the integer number zero.

10. The network of claim 8 wherein the dongle alters the message address before sending the message to the headset.

11. The network of claim 8 wherein the dongle alters the message address by left shifting the address by one integer.

12. A computerized method in a network having devices that reside in a topology, the method comprising:

coordinating communications among a plurality of associated devices by a computerized protocol manager in a computer that sends messages to associated devices in the plurality of associated devices, wherein the messages sent utilize a plurality of communication mechanisms;

receiving a message from the computerized protocol manager by a dongle, electronically coupled to the computerized protocol manager;

interrogating a message address of the received message by the dongle;

forwarding the received message automatically by the dongle to another associated device of the plurality of associated devices below the dongle in the network topology unless the message address indicates that the message is intended for the dongle, wherein the dongle's understanding of network topology consists of the computer and the devices of the network topology immediately below the dongle in the network topology;

receiving a message from the computerized protocol manager via the dongle in a headset, electronically coupled to the dongle, the headset residing below the dongle in the network typology;

interrogating a message address of the received message by the headset;

forwarding the received message automatically by the headset to another associated device of the plurality of associated devices unless the message address indicates that the message is intended for the headset, wherein the headset's understanding of network topology consists of the dongle and the devices of the network topology immediately below the headset in the network topology; and receiving a message from the computerized protocol manager via the dongle and via the headset in a third associated device, electronically coupled to the headset, wherein the headset is a native device to the computer and the third associated device is a mapped device to the computer such that the headset formats communications in a communication mechanism acceptable by the third associated device.

13. The computerized method of claim 12 wherein the plurality of communication mechanisms comprises at least two of Wi-Fi, Bluetooth, DECT, USB HID, wUSB and serial port.

14. The computerized method of claim 12, further comprising:

interrogating a message address of a received message by the third associated device;

forwarding the message automatically by the third associated device to another associated device of the plurality of associated devices unless the message address indicates that the message is intended for the third associated device; and receiving a message by a fourth associated device, electronically coupled to the third associated device, from the computerized protocol manager via the third associated device.

15. The computerized method of claim 12 wherein the third associated device comprises a mobile telephone.

16. The computerized method of claim 15 wherein the dongle communicates with the computer using DECT as a communication mechanism, the headset uses Bluetooth as a communication mechanism with the dongle, and the mobile phone uses Bluetooth as a communication mechanism with the headset.

17. The computerized method of claim 12, further comprising:

transmitting presence data associated with a presence engine via messages among the computerized protocol manager, the dongle, and the headset.

18. The computerized method of claim 12 wherein the computer resides in a television set-top box and the third associated device comprises a mobile telephone.

19. The computerized method of claim 12, further comprising:
   interrogating the message address by the dongle by examining a first portion of the message address and determining if the first portion of the message address matches a local address.

20. The computerized method of claim 19 wherein the first portion of the message address comprises a first integer number and the local address comprises the integer number zero.

21. The computerized method of claim 19, further comprising:
   altering by the dongle the message address before sending the message to the headset.

22. The computerized method of claim 19, further comprising:
   altering the message address by the dongle by left shifting the address by one integer.

\* \* \* \* \*